United States Patent
Barnhart et al.

(10) Patent No.: US 6,186,253 B1
(45) Date of Patent: Feb. 13, 2001

(54) BRAKE ACTIVATED TORQUE DISABLE IN HYBRID ELECTRIC VEHICLES

(75) Inventors: Brent A. Barnhart, Van Wert, OH (US); Nathan L. Schuler, Fort Wayne, IN (US); Michael P. Lasecki, Fort Wayne, IN (US); Theodore L. Badgley, Fort Wayne, IN (US)

(73) Assignee: Navistar International Transportation Corp., Chicago, IL (US)

( * ) Notice: Under 35 U.S.C. 154(b), the term of this patent shall be extended for 0 days.

(21) Appl. No.: 09/159,324

(22) Filed: Sep. 23, 1998

(51) Int. Cl.[7] ................................................. B60K 1/00
(52) U.S. Cl. ........................ 180/65.2; 180/65.3; 180/165
(58) Field of Search ................................ 180/65.1, 65.2, 180/65.3, 65.4, 165

(56) References Cited

U.S. PATENT DOCUMENTS

| | | | |
|---|---|---|---|
| 4,305,254 | * 12/1981 | Kawakatsu et al. | 60/716 |
| 4,335,429 | * 6/1982 | Kawakatsu | 701/102 |
| 4,591,016 | * 5/1986 | Matthews | 180/165 |
| 5,476,310 | * 12/1995 | Ohtsu et al. | 303/3 |
| 5,984,034 | * 11/1999 | Morisawa et al. | 180/65.2 |
| 6,013,992 | * 1/2000 | Ishikawa et al. | 318/376 |
| 6,026,921 | * 2/2000 | Aoyama et al. | 180/65.2 |

* cited by examiner

Primary Examiner—Brian L. Johnson
Assistant Examiner—Bridget Avery
(74) Attorney, Agent, or Firm—Jeffrey P. Calfa; Dennis Kelly Sullivan; Gilberto Hernandez

(57) ABSTRACT

An interface for interfacing an accelerator control input, a service brake control input, and a parking brake control input with a hybrid electric vehicle's electric control system that controls propulsion of the vehicle by controlling the motor torque output of an electric traction drive motor that drives driven wheels of the vehicle. The application of either the service brakes or the parking brake concurrent with the accelerator pedal being at non-idle causes the interface to override the motor torque being requested by the accelerator control input in favor of a zero motor torque request to the control system.

14 Claims, 3 Drawing Sheets

BRAKE ACTIVATED TORQUE DISABLE IN HYBRID ELECTRIC VEHICLES

FIELD OF THE INVENTION

This invention relates generally to wheeled automotive vehicles of the type in which torque that propels the vehicle is applied to driven wheels through a drivetrain from an on-board electric motor that is itself powered selectively, either by an on-board internal combustion engine driving an on-board electric generator, or by an on-board D.C. power supply, such as a compliment of D.C. batteries for example. A vehicle of this type is sometimes referred to as a hybrid electric vehicle, or HEV. More particularly the invention relates to an interface for interfacing an accelerator control input, a service brake control input, and a parking brake control input with an HEV electric control system that controls propulsion of the vehicle by controlling the motor torque output of the electric motor.

BACKGROUND AND SUMMARY OF THE INVENTION

A representative, electric-powered, wheeled, automotive vehicle has an on-board electric motor whose motor torque output provides torque input to a drivetrain that includes driven wheels supporting the vehicle on a surface along which the vehicle travels. A known electric power source for the motor comprises an on-board compliment of D.C. batteries. The drivetrain delivers the torque to the driven wheels, thereby propelling the vehicle along the underlying surface.

A representative, engine-powered, wheeled, automotive vehicle has an internal combustion engine that provides torque input to the drivetrain, and that torque is transmitted through the drivetrain to the driven wheels that propel the vehicle.

An HEV is like an electric-powered vehicle in that torque output of an electric motor provides torque input to the drivetrain. It differs however in that it has an alternative power source for the electric motor, that is additional to an on-board compliment of D.C. batteries. That alternative power source comprises an internal combustion engine that drives an electric generator. As the engine runs, it operates the electric generator, and in turn, the generator delivers electricity to run the electric motor.

An HEV also has an electric control system that may include distinct, but inter-related, sub-systems for controlling operation of the electric motor, operation of the internal combustion engine, operation of the electric generator, and re-charging of the D.C. batteries. The control allows the options of operating the vehicle by use of D.C. battery power, or of operating the vehicle by running the engine to operate the electric generator. The engine may also operate the electric generator to re-charge the batteries.

A suitable electric motor is a traction motor. The electric motor may be a D.C. motor or an A.C. one. Likewise, for the generator. Depending on particular choices for the motor and generator, the electric control may include rectifiers and/or inverters for converting one form of electric power into the other.

An HEV may be similar to an internal-combustion-engine-powered automotive vehicle in having like control inputs available to the vehicle driver, including an accelerator control input, a service brake control input, and a parking brake control input, each of which can be operated by the driver independently of the others. Each control input includes an actuator such as a hand-operated pull or lever, or a foot-operated pedal. For example, depressing an accelerator pedal from an idle position accelerates the vehicle, depressing a service brake pedal applies the service brakes, and depressing a parking brake pedal, or pulling a parking brake handle, applies a parking brake.

The service brakes are typically fluid-power-operated, with each wheel having its own brake mechanism. The parking brake may be a mechanical, non-fluid-operated mechanism, or mechanisms, proximate a portion, or portions, of the drivetrain. Because of the independent operability of each of the three control inputs, it is possible that either one of the brakes may be applied while the accelerator pedal is being depressed.

"Two-toed" operation of the service brake pedal and the accelerator pedal may potentially damage, and/or shorten the life of, involved components. Applying the parking brake while the accelerator pedal is depressed would be considered undesirable for similar reasons. Having the accelerator pedal depressed as the parking brake is being released would also be considered undesirable.

In one respect, the present invention is directed to solutions for avoiding potential problems due to simultaneous operation of an accelerator and a brake in an HEV.

One general aspect of the invention relates to an automotive vehicle comprising: a drivetrain, including wheels for supporting the vehicle on a surface along which the vehicle is propelled; an on-board electric motor that, when operated, delivers torque output through the drivetrain to driven ones of the wheels for propelling the vehicle along such a surface; an on-board internal combustion engine; an on-board electric generator; an on-board D.C. power supply; an electric control system for controlling the electric motor, including the application of electric power input to the electric motor selectively from the generator and from the D.C. power supply respectively; an accelerator control input for requesting motor torque output from the electric motor; a service brake control input for selectively applying a service brake associated with one or more of the wheels; a parking brake control input for selectively applying a parking brake associated with the drivetrain; and an interface for interfacing the accelerator control input, the service brake control input, and the parking brake control input with the electric control system to control propulsion of the vehicle. The interface comprises a service brake interface portion for detecting application of the service brake by the service brake control input, a parking brake interface portion for detecting application of the parking brake by the parking brake control input, and an interface output portion for causing the electric control to operate the electric motor such that no motor torque output is delivered through the drivetrain from the motor when either brake interface portion detects application of the respective brake by the respective brake control input.

Another general aspect of the invention relates to an automotive vehicle comprising: a drivetrain, including wheels for supporting the vehicle on a surface along which the vehicle is propelled; an on-board electric motor that, when operated, delivers torque output through the drivetrain to driven ones of the wheels for propelling the vehicle along such a surface; an on-board internal combustion engine; an on-board electric generator; an on-board D.C. power supply; an electric control system for controlling the electric motor, including the application of electric power input to the electric motor selectively from the generator and from the D.C. power supply respectively; an accelerator control input for requesting motor torque output from the electric motor; a brake control input for selectively applying a brake associated with the drivetrain; and an interface for interfacing the accelerator control input and the brake control input with the electric control system to control propulsion of the vehicle. The interface comprises a brake interface portion for detecting application of the brake by the brake control input and an interface output portion for causing the electric control to operate the electric motor such that when the brake interface portion detects application of the brake by the brake control input, the motor torque output is rendered insufficient to cause propulsion of the vehicle along the surface.

Still another general aspect of the invention relates to a method of operating an automotive vehicle that has: a drivetrain, including wheels for supporting the vehicle on a surface along which the vehicle is propelled; an on-board electric motor that, when operated, delivers torque output through the drivetrain to driven ones of the wheels for propelling the vehicle along such a surface; an on-board internal combustion engine; an on-board electric generator; an on-board D.C. power supply; an electric control system for controlling the electric motor, including the application of electric power input to the electric motor selectively from the generator and from the D.C. power supply respectively; an accelerator control input for requesting motor torque output from the electric motor; a brake control input for selectively applying a brake associated with the drivetrain; and an interface for interfacing the accelerator control input and the brake control input with the electric control system to control propulsion of the vehicle, the interface comprising a brake interface portion for detecting application of the brake by the brake control input, and an interface output portion. The method comprises causing the electric control to operate the electric motor such that when the brake interface portion detects application of the brake by the brake control input, the motor torque output is rendered insufficient to cause propulsion of the vehicle along the surface.

More specific aspects of the invention will been set forth in the ensuing description, claims, and accompanying drawings.

The drawings, which will now be briefly described, are incorporated herein to illustrate a preferred embodiment of the invention and a best mode presently contemplated for carrying out the invention.

DESCRIPTION OF THE PREFERRED EMBODIMENT

Figure 1:
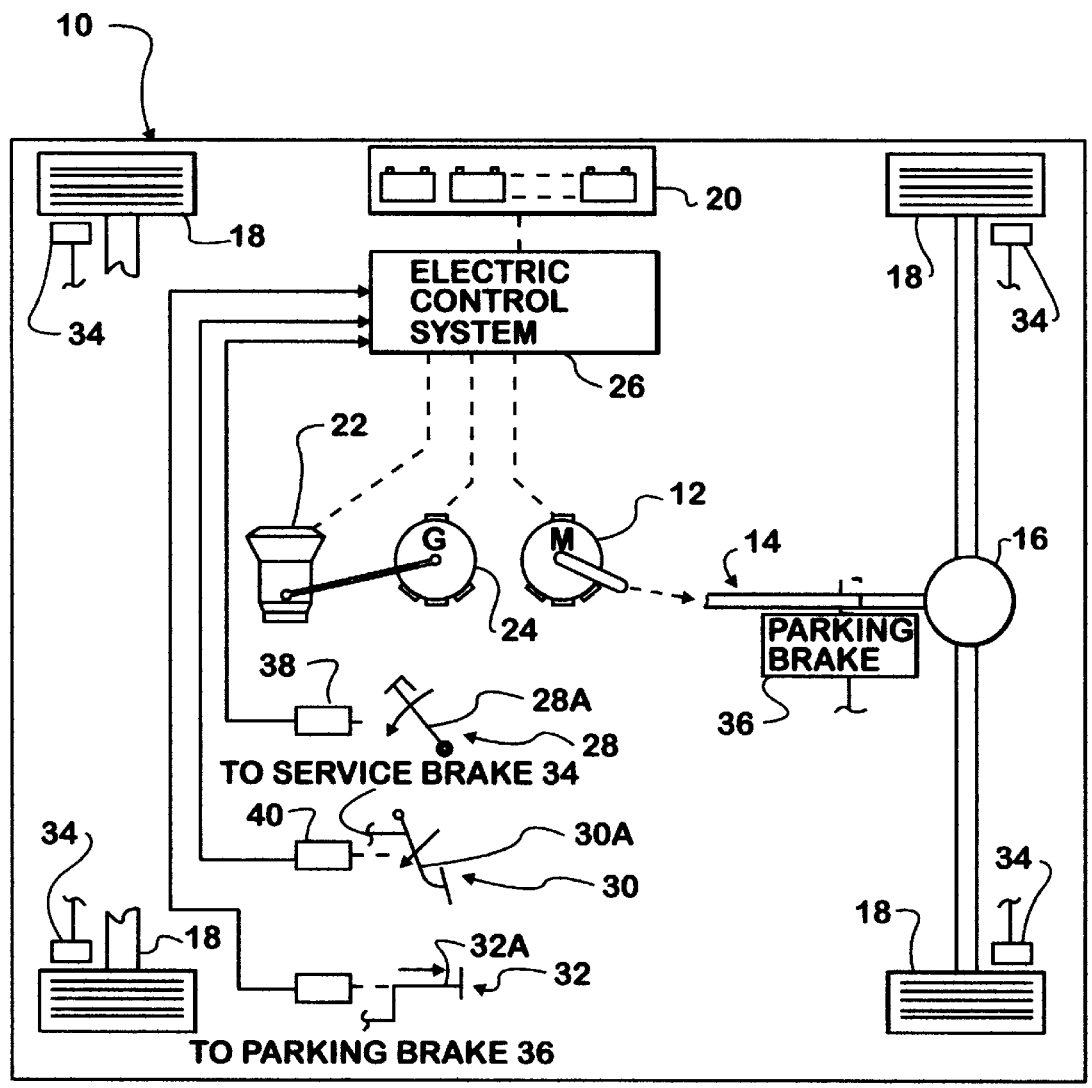
FIG. 1 is a general schematic block diagram of an HBEV powertrain including an electric control system.

FIG. 1 illustrates a hybrid electric vehicle (HEV) 10 that has an electric motor 12 whose shaft applies torque input to a drivetrain 14 that includes an axle 16 having driven wheels 18. HEV 10 includes other wheels 18 which may be non-driven. One source of electric power for operating motor 12 comprises an on-board compliment of D.C. batteries 20. Another source comprises an internal combustion engine 22, a diesel engine for example, that drives an electric generator 24. As engine 22 runs, it operates electric generator 24, which can deliver electricity to run motor 12. Drivetrain 14 delivers torque to driven wheels 18 on axle 16, thereby propelling vehicle 10 along a surface on which all wheels 18 support the vehicle.

FIG. 1 further shows an associated electric control system 26 that may include distinct, but inter-related, subsystems for controlling operation of motor 12, operation of engine 22, operation of electric generator 24, and re-charging of D.C. batteries 20. The control allows the options of operating HEV 10 by use of D.C. battery power from batteries 20, or of operating the vehicle by running engine 22 to operate generator 24. Engine 22 can also operate generator 24 to re-charge batteries 20.

HEV 10 is similar to certain internal-combustion-engine-powered automotive vehicles in having like control inputs for the driver to operate, including an accelerator control input 28, a service brake control input 30, and a parking brake control input 32, each of which is operable independent of the others. Each control input includes a respective actuator, foot-operated pedals 28A, 30A respectively for accelerator control input 28 and service brake control input 30 respectively, and either a foot-operated pedal, or a hand-operated pull or lever, 32A for parking brake control 32. Depressing accelerator pedal 28A from an idle position accelerates HEV 10. Depressing service brake pedal 30A from rest position applies service brakes 34. A parking brake 36 is applied by pulling pull, or lever, 32A.

Service brakes 34 are fluid-power-operated, and each wheel 18 has its own service brake mechanism. Parking brake 36 is a mechanical, non-fluid-operated mechanism, or mechanisms, proximate a portion, or portions, of drivetrain 14.

Accelerator control input 28 further includes an electric circuit device 38, a potentiometer for example, forming one of a number of control inputs to electric control system 26. Service brake control input 30 further includes an electric circuit device 40, a switch for example, forming another control input to system 26, and parking brake control input 32 further includes an electric circuit device 42, a switch for example, forming yet another control input to system 26. Each respective switch 40, 42 is set to trip just as the vehicle driver commences application of the respective brake.

Accelerator pedal 28A, acting through potentiometer 38, provides a torque request signal input to system 26. As accelerator pedal 28A is increasingly depressed from an idle position, a wiper of potentiometer 38 is increasingly displaced from idle position to deliver an increasing torque request signal. System 26 responds by causing motor 12 to deliver increasing torque in correlation with the increasing torque request signal. While the torque load that is imposed by HEV 10 on motor 12 is a function of several factors, including road load and wind resistance load, the speed at which HEV 10 travels will generally increase as accelerator pedal 28A is increasingly depressed and will generally decrease as the pedal is increasingly released. When the accelerator pedal is in idle position, no torque request signal is being input to system 26.

If the vehicle driver depresses service brake pedal 30A with the same foot used to operate accelerator pedal 28A, a return spring acting on accelerator pedal 28A should be effective to return the released accelerator pedal to idle before the driver depresses the service brake pedal. In that case, potentiometer 38 will have returned to idle position before switch 40 is tripped to signal that the service brake is being applied. Because potentiometer 38 delivers a zero torque request signal input to system 26 when in idle position, system 26 should be commanding motor 12 to deliver no torque to drivetrain 14 when switch 40 is tripped to signal service brake application. Such a mode of operation is desirable in order to avoid the counter-effect of motor 12 trying to drive driven wheels 18 at the same time that the service brakes are trying to stop them.

Because of the independent operability of each of the three control inputs, it is possible for either one, or both, brakes 34, 36 to be applied while accelerator pedal 28A is being depressed. For example, if the driver depresses brake pedal 30A with one foot while the other foot is still depressing accelerator pedal 28A, the motor torque that would be applied through drivetrain 14 to drive wheels 18 would counteract the braking force being applied to the driven wheels by the service brakes. Such a condition is considered undesirable for reasons explained earlier. The present invention, as will be more fully explained, prevents that condition from occurring.

Parking brake 36 can also be applied while accelerator pedal 28A is being depressed, and that is another condition that would be considered undesirable. The present invention, as will be more fully explained also, prevents that condition too from occurring.

Figure 2:
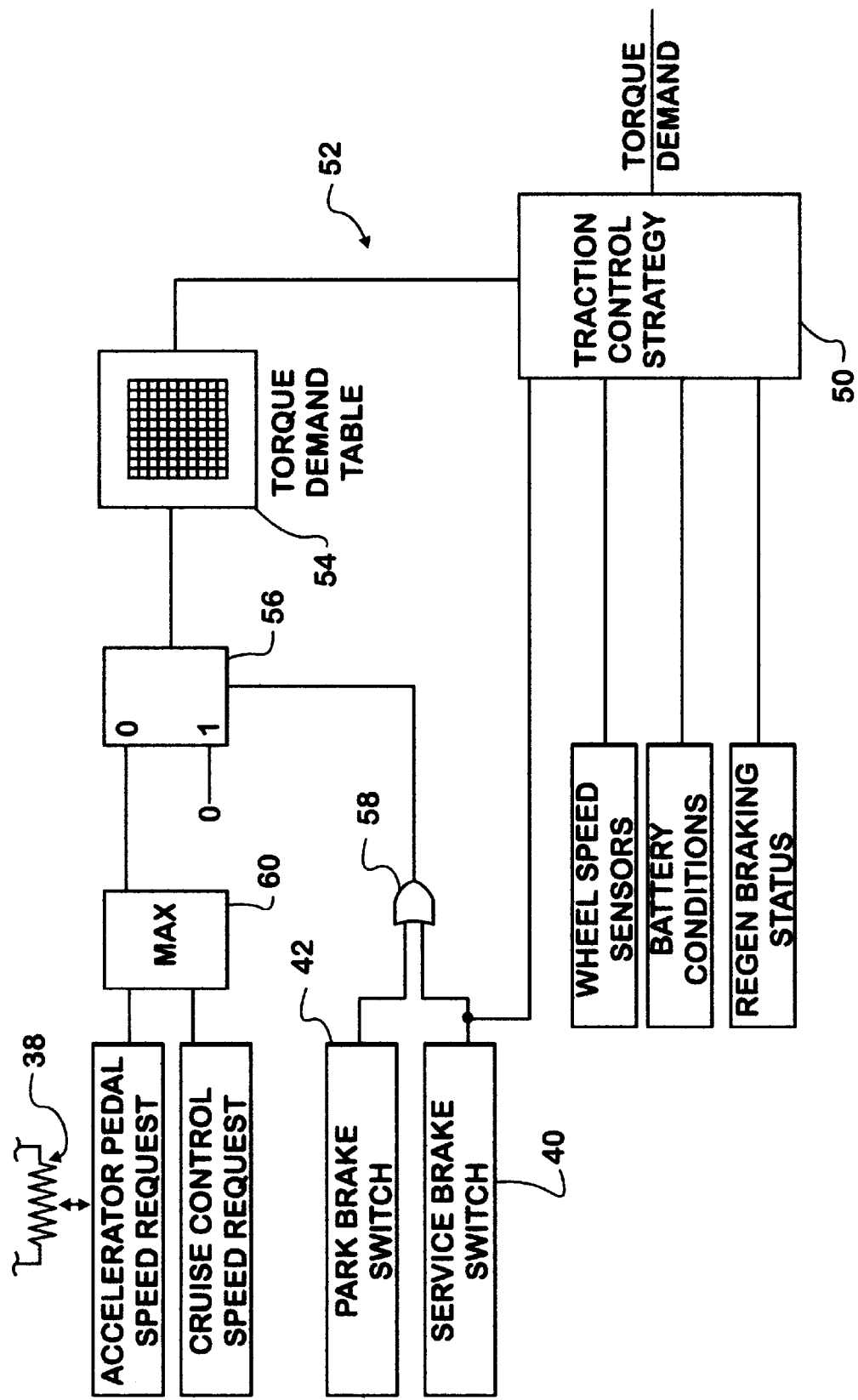
FIG. 2 is a schematic software diagram illustrating principles of the invention.

FIG. 2 discloses a torque command strategy software solution suitable for a system 26 that is microprocessor-based. For controlling the operation of motor 12, the microprocessor-based system embodies a traction control strategy, depicted generally by a block 50. The Figure shows some of the various control inputs to block 50, including a software implementation of an interface 52 embodying principles of the present invention. The interface includes a torque demand look-up table 54, and software equivalents of a switch 56, an OR logic gate 58, and a maximum value selector 60.

Switches 40 and 42 provide respective inputs to OR logic gate 58, which in turn controls switch 56. One input to maximum value selector 60 corresponds to the signal from potentiometer 38 representing the extent to which accelerator pedal 28A is depressed. The other input to maximum value selector 60 is a cruise control speed request signal derived from a cruise control system that, when turned on by the driver, sets a desired speed at which the vehicle runs. The output of maximum value selector 60 is the larger of the two inputs, and that output is passed as an input to switch 56. Another input to switch 56 is fixed at zero.

Switch 56 functions to pass the signal from maximum value selector 60 to torque demand look-up table 54 so long as neither switch 40 or 42 has been tripped. In that case, table 54 supplies to block 50 a torque command signal that is correlated by the table to the value of the larger of the accelerator pedal speed request signal and the cruise control speed request signal. While the requested torque will be delivered to the driven wheels under typically normal operating conditions, the occurrence of atypical operating conditions, such as may be sensed by other control inputs, may cause the actual torque delivered to be different from the requested torque that would be delivered under typically normal conditions. For example, a wheel speed sensor that senses wheel slip may cause torque delivered to driven wheels to differ from torque requested by table 54.

When either switch 40 or 42 is tripped, switch 56 passes the fixed zero input to table 54 instead of the signal from maximum value selector 60. Under this condition, a zero torque demand signal is applied to block 50 from interface 52. Under typical normal operation, this will result in zero motor torque, or at least insufficient motor torque to propel the vehicle, being delivered from motor 12.

It should be appreciated that if the vehicle lacks a cruise control feature, maximum value selector 60 could be omitted, and the signal derived from potentiometer 38 applied directly to switch 56.

Figure 3:
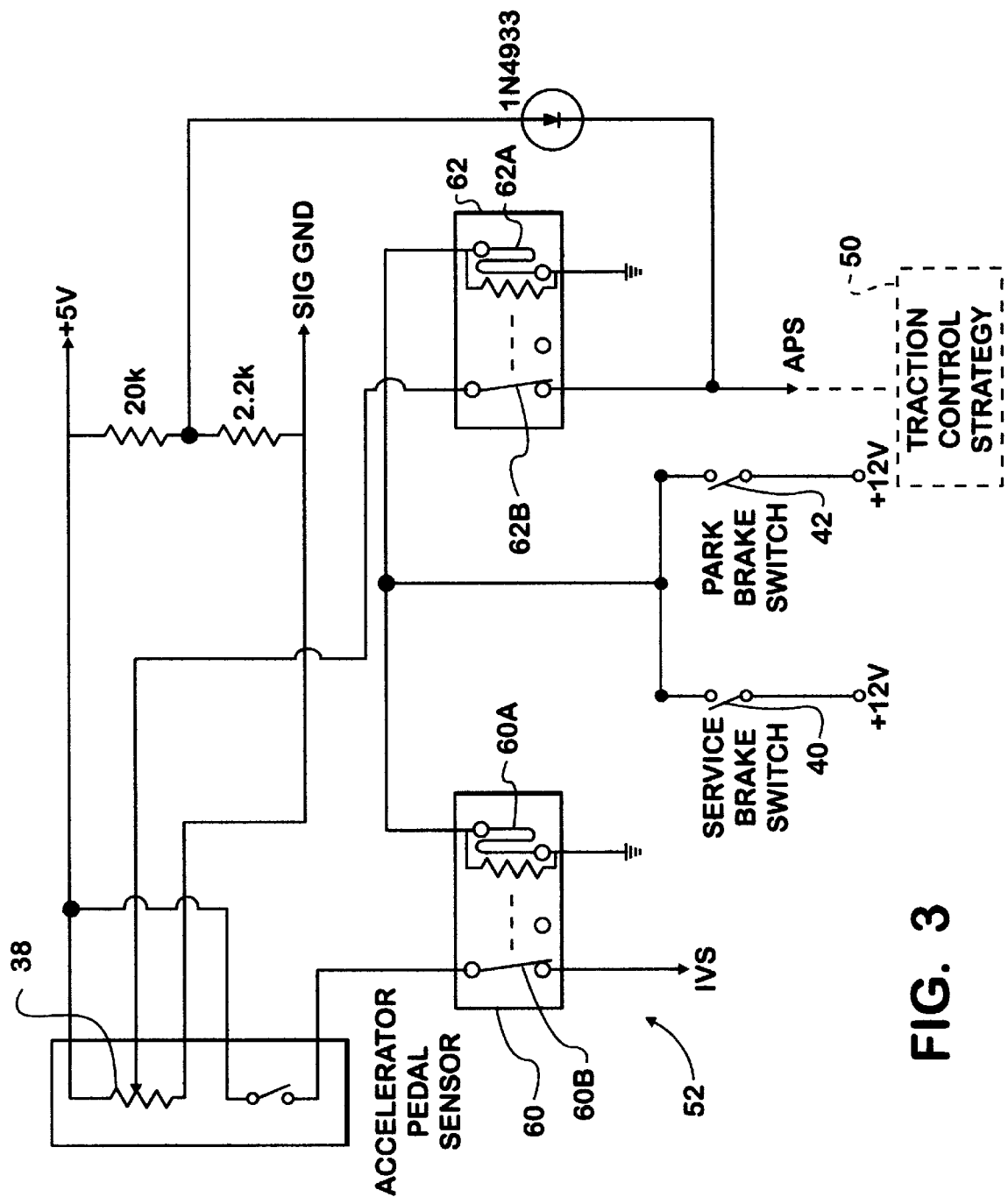
FIG. 3 is a schematic hardware diagram illustrating principles of the present invention.

FIG. 3 discloses a torque command strategy hardware solution suitable for implementing interface 52. The hardware includes two normally closed relays 60, 62 having respective coils 60A, 62A and respective normally closed contacts 60B, 62B connected in circuit with other circuit devices as portrayed. Relay 60 is present because the particular accelerator pedal position sensor that contains potentiometer 38 also contains an idle validation switch. The fact that an idle validation switch is present in the sensor does not directly bear on the present invention, and it is to be therefore appreciated that it is shown merely for reference.

Insofar as principles of the present invention are concerned, FIG. 3 shows that the wiper of potentiometer 38 is connected through contacts 62B to block 50. Switches 40 and 42 are connected to relay coils 60A, 62A such that tripping of either switch will energize both coils to operate both sets of contacts 60B, 62B open. The opening of contacts 62B disconnects block 50 from potentiometer 38 which is understood by the system to mean that zero motor torque output is being requested.

While a presently preferred embodiment of the invention has been illustrated and described, it should be appreciated that principles of the invention are applicable to all embodiments and uses that fall within the scope of the following claims.

What is claimed is:

1. An automotive vehicle comprising:

a drivetrain, including wheels for supporting the vehicle on a surface along which the vehicle is propelled;

an on-board electric motor that, when operated, delivers torque output through the drivetrain to driven ones of the wheels for propelling the vehicle along such a surface;

an on-board internal combustion engine;

an on-board electric generator;

an on-board D.C. power supply;

an electric control system for controlling the electric motor, including the application of electric power input to the electric motor selectively from the generator and from the D.C. power supply respectively;

an accelerator control input for requesting motor torque output from the electric motor;

a service brake control input for selectively applying a service brake associated with one or more of the wheels;

a parking brake control input for selectively applying a parking brake associated with the drivetrain;

and an interface for interfacing the accelerator control input, the service brake control input, and the parking brake control input with the electric control system to control propulsion of the vehicle;

the interface comprising a service brake interface portion for detecting application of the service brake by the service brake control input, a parking brake interface portion for detecting application of the parking brake by the parking brake control input, and an interface output portion for causing the electric control to operate the electric motor such that no motor torque output is delivered through the drivetrain from the motor when either brake interface portion detects application of the respective brake by the respective brake control input.

2. An automotive vehicle as set forth in claim 1 in which the service brake comprises a fluid-power-operated brake for braking an associated wheel, the service brake control input comprises a service brake actuator for operating the fluid-power-operated brake to brake the associated wheel, and the service brake interface comprises a service brake electric circuit device that is responsive to operation of the service brake actuator for providing an electric service brake signal that distinguishes between application and non-application of the fluid-power-operated brake by the service brake actuator.

3. An automotive vehicle as set forth in claim 2 in which the accelerator control input comprises an accelerator pedal, the interface comprises an accelerator interface that comprises an accelerator electric circuit device that is responsive to operation of the accelerator pedal for providing an electric torque signal requesting the electric motor to deliver a corresponding torque output, and the service brake interface allows the electric torque signal to pass from the accelerator electric circuit device to the electric control system when the service brake electric circuit device provides an electric service brake signal corresponding to non-application of the fluid-power-operated brake by the service brake actuator, but when the service brake electric circuit device provides an electric service brake signal corresponding to application of the fluid-power-operated brake by the service brake actuator, the service brake interface overrides the electric torque signal from the accelerator electric circuit device by forcing a zero torque request electric signal input to the electric control system instead of the electric torque signal from the accelerator electric circuit device.

4. An automotive vehicle as set forth in claim 1 in which the parking brake comprises a parking brake mechanism proximate a portion of the drivetrain, the parking brake control input comprises a parking brake actuator for operating the parking brake mechanism to apply a brake to the drivetrain, and the parking brake interface comprises a parking brake electric circuit device that is responsive to operation of the parking brake actuator for providing an electric parking brake signal that distinguishes between application and non-application of the parking brake mechanism by the parking brake actuator.

5. An automotive vehicle as set forth in claim 4 in which the accelerator control input comprises an accelerator pedal, the interface comprises an accelerator interface that comprises an accelerator electric circuit device that is responsive to operation of the accelerator pedal for providing an electric torque signal requesting the electric motor to deliver a corresponding torque output, and the parking brake interface allows the electric torque signal to pass from the accelerator electric circuit device to the electric control system when the parking brake electric circuit device provides an electric parking brake signal corresponding to non-application of the parking brake mechanism by the parking brake actuator, but when the parking brake electric circuit device provides an electric parking brake signal corresponding to application of the parking brake mechanism by the parking brake actuator, the parking brake interface overrides the electric torque signal from the accelerator electric circuit device by forcing a zero torque request electric signal input to the electric control system instead of the electric torque signal from the accelerator electric circuit device.

6. An automotive vehicle as set forth in claim 5 in which the service brake comprises a fluid-power-operated brake for braking an associated wheel, the service brake control input comprises a service brake actuator for operating the fluid-power-operated brake to brake the associated wheel, the service brake interface comprises a service brake electric circuit device that is responsive to operation of the service brake actuator for providing an electric service brake signal that distinguishes between application and non-application of the fluid-power-operated brake by the service brake actuator, and the service brake interface allows the electric torque signal to pass from the accelerator electric circuit device to the electric control system when the service brake electric circuit device provides an electric service brake signal corresponding to non-application of the fluid-power-operated brake by the service brake actuator, but when the service brake electric circuit device provides an electric service brake signal corresponding to application of the fluid-power-operated brake by the service brake actuator, the service brake interface overrides the electric torque signal from the accelerator electric circuit device by forcing a zero torque request electric signal input to the electric control system instead of the electric torque signal from the accelerator electric circuit device.

7. An automotive vehicle as set forth in claim 6 in which the parking brake electric circuit device comprises a parking brake switch, the service brake electric circuit device comprises a service brake switch, and the accelerator electric circuit device comprises a potentiometer.

8. An automotive vehicle comprising:
a drivetrain, including wheels for supporting the vehicle on a surface along which the vehicle is propelled;
an on-board electric motor that, when operated, delivers torque output through the drivetrain to driven ones of the wheels for propelling the vehicle along such a surface;
an on-board internal combustion engine;
an on-board electric generator;
an on-board D.C. power supply;
an electric control system for controlling the electric motor, including the application of electric power input to the electric motor selectively from the generator and from the D.C. power supply respectively;
an accelerator control input for requesting motor torque output from the electric motor;
a brake control input for selectively applying a brake associated with the drivetrain;
and an interface for interfacing the accelerator control input and the brake control input with the electric control system to control propulsion of the vehicle;
the interface comprising a brake interface portion for detecting application of the brake by the brake control input, and an interface output portion for causing the electric control to operate the electric motor such that when the brake interface portion detects application of the brake by the brake control input, the motor torque output is rendered insufficient to cause propulsion of the vehicle along the surface.

9. An automotive vehicle as set forth in claim 8 in which the interface output portion for causing the electric control to operate the electric motor such that when the brake interface portion detects application of the brake by the brake control input, the motor torque output is rendered insufficient to cause propulsion of the vehicle along the surface when the brake interface portion detects application of the brake by the brake control input causes the electric control to command the electric motor to reduce the torque output to zero when the brake interface portion detects application of the brake by the brake control input.

10. An automotive vehicle as set forth in claim 9 in which the brake control input for selectively applying a brake associated with the drivetrain comprises a service brake control input for selectively applying a service brake associated with one or more of the wheels and a parking brake control input for selectively applying a parking brake associated with the drivetrain, in which the brake interface portion comprises a service brake interface portion for detecting application of the service brake by the service brake control input and a parking brake interface portion for detecting application of the parking brake by the parking brake control input, and in which the interface output portion causes the electric control to command the electric motor to deliver no torque output when either one of the service brake interface portion and the parking brake interface portion detects application of the respective one of the service brake and the parking brake by the respective one of the service brake control input and the parking brake control input.

11. An automotive vehicle as set forth in claim 10 in which the service brake comprises a fluid-power-operated brake for braking an associated wheel, the service brake control input comprises a service brake actuator for operating the fluid-power-operated brake to brake the associated wheel, the service brake interface comprises a service brake electric circuit device that is responsive to operation of the service brake actuator for providing an electric service brake signal that distinguishes between application and non-application of the fluid-power-operated brake by the service brake actuator, the accelerator control input comprises an accelerator pedal, the interface comprises an accelerator interface that comprises an accelerator electric circuit device that is responsive to operation of the accelerator pedal for providing an electric torque signal requesting the electric motor to deliver a corresponding torque output, and the service brake interface allows the electric torque signal to pass from the accelerator electric circuit device to the electric control system when the service brake electric circuit device provides an electric service brake signal corresponding to non-application of the fluid-power-operated brake by the service brake actuator, but when the service brake electric circuit device provides an electric service brake signal corresponding to application of the fluid-power-operated brake by the service brake actuator, the service brake interface overrides the electric torque signal from the accelerator electric circuit device by forcing a zero torque request electric signal input to the electric control system instead of the electric torque signal from the accelerator electric circuit device, and in which the parking brake comprises a parking brake mechanism proximate a portion of the drivetrain, the parking brake control input comprises a parking brake actuator for operating the parking brake mechanism to apply a brake to the drivetrain, and the parking brake interface comprises a parking brake electric circuit device that is responsive to operation of the parking brake actuator for providing an electric parking brake signal that distinguishes between application and non-application of the parking brake mechanism by the parking brake actuator, and the parking brake interface allows the electric torque signal to pass from the accelerator electric circuit device to the electric control system when the parking brake electric circuit device provides an electric parking brake signal corresponding to non-application of the parking brake mechanism by the parking brake actuator, but when the parking brake electric circuit device provides an electric parking brake signal corresponding to application of the parking brake mechanism by the parking brake actuator, the parking brake interface overrides the electric torque signal from the accelerator electric circuit device by forcing a zero torque request electric signal input to the electric control system instead of the electric torque signal from the accelerator electric circuit device.

12. A method of operating an automotive vehicle that has:
a drivetrain, including wheels for supporting the vehicle on a surface along which the vehicle is propelled;
an on-board electric motor that, when operated, delivers torque output through the drivetrain to driven ones of the wheels for propelling the vehicle along such a surface;
an on-board internal combustion engine;
an on-board electric generator;
an on-board D.C. power supply;
an electric control system for controlling the electric motor, including the application of electric power input to the electric motor selectively from the generator and from the D.C. power supply respectively;
an accelerator control input for requesting motor torque output from the electric motor;
a brake control input for selectively applying a brake associated with the drivetrain;
and an interface for interfacing the accelerator control input and the brake control input with the electric control system to control propulsion of the vehicle;
the interface comprising a brake interface portion for detecting application of the brake by the brake control input, and an interface output portion;
the method comprising:
causing the electric control to operate the electric motor such that when the brake interface portion detects application of the brake by the brake control input, the motor torque output is rendered insufficient to cause propulsion of the vehicle along the surface.

13. A method as set forth in claim 12 in which the step of causing the electric control to operate the electric motor such that when the brake interface portion detects application of the brake by the brake control input, the motor torque output is rendered insufficient to cause propulsion of the vehicle along the surface when the brake interface portion detects application of the brake by the brake control input comprises causing the electric control to command the electric motor to reduce the torque output to zero when the brake interface portion detects application of the brake by the brake control input.

14. A method as set forth in claim 13 in which the brake control input for selectively applying a brake associated with the drivetrain comprises a service brake control input for selectively applying a service brake associated with one or more of the wheels and a parking brake control input for selectively applying a parking brake associated with the drivetrain, and the brake interface portion comprises a service brake interface portion for detecting application of the service brake by the service brake control input and a parking brake interface portion for detecting application of the parking brake by the parking brake control input, and in which the step of causing the electric control to command the electric motor to reduce the torque output to zero when the brake interface portion detects application of the brake by the brake control input, the brake interface output portion comprises causing the electric control to command the electric motor to deliver no torque output when either one of the service brake interface portion and the parking brake interface portion detects application of the respective one of the service brake and the parking brake by the respective one of the service brake control input and the parking brake control input.

* * * * *